US012332170B2

(12) United States Patent
Ball et al.

(10) Patent No.: US 12,332,170 B2
(45) Date of Patent: *Jun. 17, 2025

(54) LASER IMAGING OF GASES FOR CONCENTRATION AND LOCATION IDENTIFICATION

(71) Applicant: Ohio State Innovation Foundation, Columbus, OH (US)

(72) Inventors: Christopher Ball, Westerville, OH (US); Theodore Ronningen, Lewis Center, OH (US); Douglas Fink, Columbus, OH (US); Brett Ringel, Columbus, OH (US); Sanjay Krishna, Plain City, OH (US); Earl Fuller, Columbus, OH (US); Douglas Mooney, Columbus, OH (US)

(73) Assignee: Ohio State Innovation Foundation, Columbus, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/362,430

(22) Filed: Jul. 31, 2023

(65) Prior Publication Data

US 2024/0035961 A1 Feb. 1, 2024

Related U.S. Application Data

(63) Continuation of application No. 16/840,941, filed on Apr. 6, 2020, now Pat. No. 11,714,046.

(60) Provisional application No. 62/889,688, filed on Aug. 21, 2019, provisional application No. 62/829,261, filed on Apr. 4, 2019.

(51) Int. Cl.
*G01N 21/3504* (2014.01)

(52) U.S. Cl.
CPC ............................... *G01N 21/3504* (2013.01)

(58) Field of Classification Search
CPC .................................................. G01N 21/3504
See application file for complete search history.

(56) References Cited

U.S. PATENT DOCUMENTS

| 2005/0286054 | A1* | 12/2005 | Chen ...................... G01N 21/39 356/437 |
| 2011/0038507 | A1* | 2/2011 | Hager ................ G01N 21/3504 382/100 |
| 2019/0257749 | A1 | 8/2019 | Hazama et al. |

* cited by examiner

*Primary Examiner* — Jamil Ahmed
(74) *Attorney, Agent, or Firm* — Meunier Carlin & Curfman LLC (57) ABSTRACT

A system and method indicate capability for detecting methane leaks inside buildings. This approach provides the ability to detect methane behind high efficiency coated windows and can extract methane concentration (rather than concentration-path length product CL). Lock-in imaging technologies can facilitate lower laser transmitter power. A field deployable, hand held prototype sensor for use in remote sensing a appropriate standoff distances can support operational testing. Distance infrared imaging of methane is feasible. Fully characterized real time image of a methane cloud offers operational advantages in accuracy and safety as compared to current sensors.

20 Claims, 6 Drawing Sheets

LASER IMAGING OF GASES FOR CONCENTRATION AND LOCATION IDENTIFICATION

CROSS REFERENCE TO RELATED APPLICATION

This application is a continuation of U.S. patent application Ser. No. 16/840,941, now U.S. Pat. No. 11,714,046, which claims priority to U.S. Provisional Patent Application Ser. No. 62/829,261 filed on Apr. 4, 2019, and entitled "Methane Detection Technology for First Responder and Customer Safety," and further claims priority to U.S. Provisional Patent Application Ser. No. 62/889,688 filed on Aug. 21, 2019, entitled "Laser Imaging of Gases for Real-Time Determination of Concentration and Location" both of which are incorporated by reference as if set forth verbatim herein.

STATEMENT REGARDING FEDERALLY FUNDED RESEARCH

This disclosure did not utilize federal funds in the development.

FIELD OF THE DISCLOSURE

This disclosure relates to systems and methods of standoff imaging of areas in which gas concentrations are of concern and uses laser imaging spectrum analysis to identify a gas, a concentration of the gas, and a location of the gas in an enclosed area, even through windows whether open or closed.

BACKGROUND

There is a critical need to detect leaks in gas lines to ensure the safety of responders and customers. Distribution companies can receive over 100,000 calls per year responding to gas odors (i.e., leaks). Of these calls, 500-1,000 pose safety risks to responders and customers alike.

Several methane detection technologies are commercially available. The most common is based on hand-held Flame Ionization Detection (FID). This handheld technology is inexpensive and reliable, but it requires direct contact with the subject gas such as but not limited to methane gas, putting the operator at risk. Optical technologies, such as passive imaging or active tunable diode laser spectroscopy, enable standoff detection, however detection reliability, measuring concentration-path length product (CL) and acquisition cost are problematic. Other options include passive optical imaging which can detect large leaks, but passive sensing is not as sensitive as active optical sensing. Passive optical imaging is also more expensive than other choices. Tunable Diode Laser Absorption Spectroscopy (TDLAS) is one form of active optical sensing that does offer standoff and through-window sensing, but it is more expensive than much of the market is willing to tolerate.

A need still exists in the field of gas concentration and gas location detection for a solution that operates from outside of a building in question and from a safe standoff distance. It is furthermore desirable to enable detection of a gas, such as methane ($CH_4$) at explosive levels (4-15 percent). The solution to this problem should be easy to use for numerous levels of education, beginning with a high school graduate working as a first responder. The system for gas detection should also be portable (easily moved from vehicle to building), cost effective, reliable and well calibrated without intense maintenance. In fact, maintenance and recalibration should be infrequent, inexpensive, and require little to no consumables.

BRIEF SUMMARY

Various implementations are directed to methods and systems for detecting gas concentration and gas location within numerous areas, both open and enclosed.

In one embodiment, a system for evaluating a target gas within an area of space includes at least one light source directing a light wave toward an area of space to be analyzed in regard to a target gas. At least one processor in at least one computer modulates the light source between an on-resonance state, relative to the absorption spectrum of the target gas, and an off-resonance state, relative to the absorption spectrum of the target gas. An imaging device is positioned relative to the area of space such that the imaging device receives reflected light from the area of space, the imaging device configured to form an image from the reflected light showing the presence or absence of the target gas within the area of space.

In another embodiment, a method of evaluating a target gas within an area of space includes the steps of directing at least one light wave from at least one light source toward an area of space to be analyzed in regard to a target gas; modulating the light source between an on-resonance state, relative to the absorption spectrum of the target gas, and an off-resonance state, relative to the absorption spectrum of the target gas; receiving, at an imaging device, reflected light wherein the reflected light includes a first wavelength reflection corresponding to the on-resonance state and a second wavelength reflection corresponding to the off resonance state of the light source; and forming an image of the target gas in the area with the reflected light.

The details of one or more implementations of the invention are set forth in the accompanying drawings and the description below. Other features, objects, and advantages of the invention will be apparent from the description and drawings, and from the claims.

BRIEF DESCRIPTION OF THE DRAWINGS

Various implementations of the system are explained in even greater detail in the following exemplary drawings. The drawings are merely exemplary to illustrate the structure of the system and certain features that may be used singularly or in combination with other features. The invention should not be limited to the implementations shown.

DETAILED DESCRIPTION

This disclosure sets forth the details for construction and use of single wavelength lasers at reduced cost and complexity, and the embodiments described below enable imaging gases with an active source that enhances performance. The active imaging system of the embodiments herein will leverage short wave infrared (SWIR) remote sensing advancements for a hand-held imaging system. After conducting extensive due diligence research into sensing requirements, motivated by industry need for safety of technicians responding to gas leaks, the sensor concept must:

1. Detect a toxic or dangerous gas, such as but not limited to methane, at an accurate ppm level (part per million value) or percentage value at 30 meter standoff distance;
2. Quantify methane concentration (not concentration-path length product (CL));
3. Detect methane through windowpanes where double pane and coated windows pose problems, and films and extra panes increase reflection that also skews results.

Spectroscopy Considerations

Figure 2:
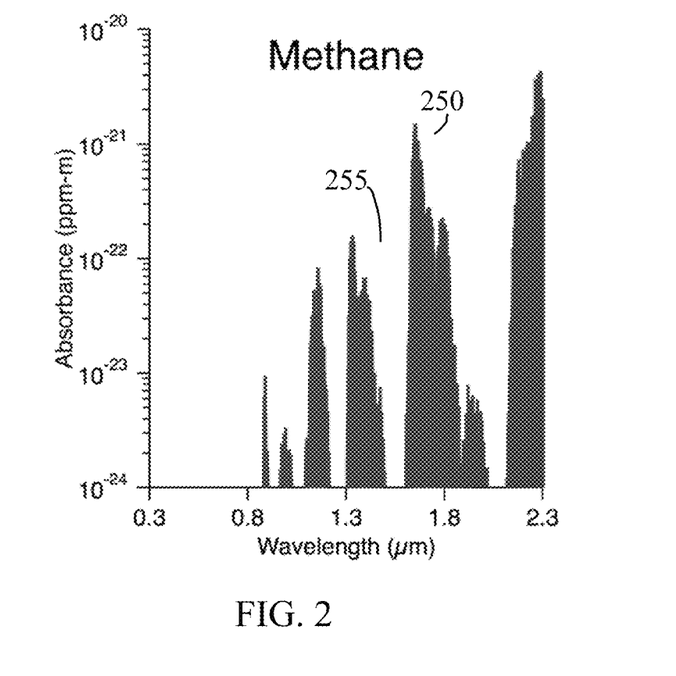
FIG. 2 is a schematic plot view of an absorption spectrum of methane gas according to one implementation of this disclosure.
Figure 7:
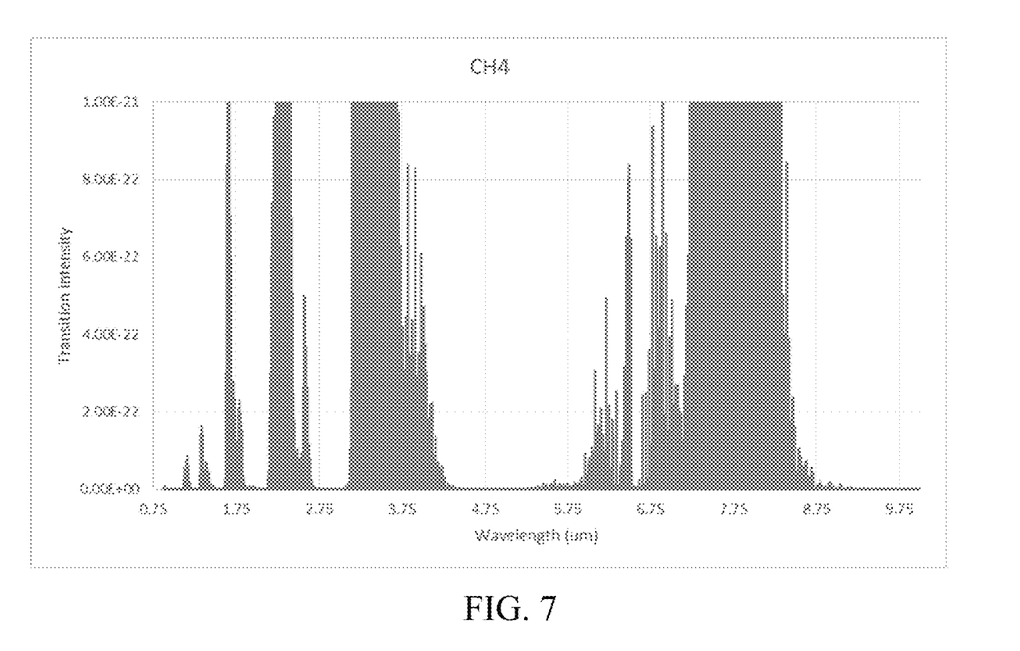
FIG. 7 is a schematic plot of methane absorption spectrum as described herein.

As illustrated in FIG. 2 and FIG. 7, methane has very strong absorption bands at mid-wave infrared (3.2 microns) and long-wave infrared (7.5 microns). However, these wavelengths cannot propagate through glass windowpanes. Therefore, methane bands below 2 microns were exploited to meet the sensing requirements of this disclosure. To detect a methane leak, lasers sources 500 are selected based on wavelengths of methane spectral features ("on resonance" (250)) as well as wavelengths at which methane does not absorb ("off-resonance" (255)). The ratio of reflected light signals (550) acquired at these two wavelengths is proportional to methane concentration. This is the basic concept underlying Differential Absorption LIDAR (DIAL). As explained at public resources (e.g., https://www.nist.gov/programs-projects/differential-absorption-lidar-detection-and-quantification-greenhouse-gases), differential absorption LIDAR (DIAL) is based on the same general principles of traditional LIDAR, but operates at two wavelengths, one on resonance and one off resonance of the target gas absorption spectrum. On resonance wavelengths are absorbed by the target gas to a greater extent than off resonance wavelengths, so the difference between both signals is proportional to a target gas number density for an area under analysis.

Two variants of the technology have been developed for this disclosure using off-the-shelf components. The first operates in the short-wave infrared near 1650 nm and demonstrated excellent results for open air methane detection. The second operates in the near-infrared at 887 nm and used novel lock-in imaging techniques to enable methane detection through windows and can be used in responding to gas odor.

A laser-based imaging system was designed using two different lasers (500A, 500B) to generate on-resonance and off-resonance wavelengths. The beams are directed to the target (methane cloud behind a building window), reflected off of a back surface (wall), and then detected by an infrared imaging camera. The combination of spectral and spatial information provides a basis for true concentration determination. Non-imaging systems can detect only the product of concentration and path length through the cloud.

1650 nm System and Test Results

Figure 8A:
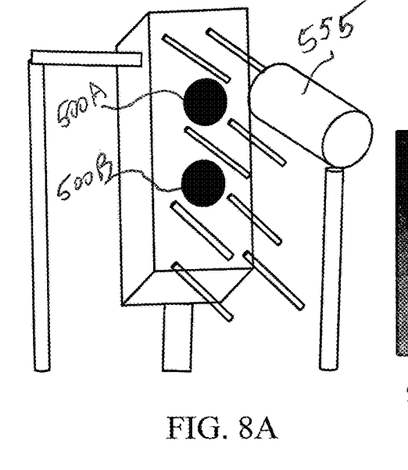
FIG. 8A is an example 1650 nanometer gas imaging system according to this disclosure.
Figure 8B:
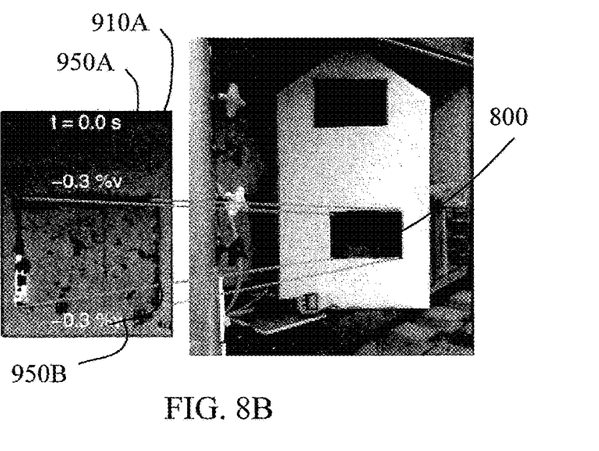
FIG. 8B is a gas containment system inside a fume hood according to this disclosure.

In a first system shown by example in FIGS. 8A and 8B, integrated lasers were operating at 1650 nm (on resonance) and 1550 nm (off-resonance) with a research grade short wave infrared (SWIR) imager. The system was tested against a methane chamber in a fume hood. Quantification accuracy was excellent (±5%) for open air or uncoated windows. However, the system could not detect methane through a high efficiency coated window.

887 nm System and Test Results

Figure 3:
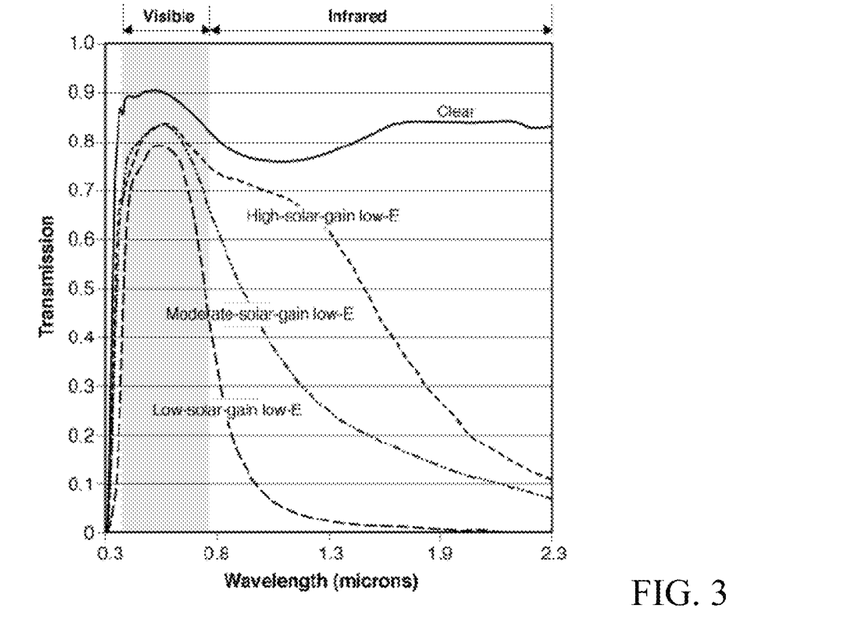
FIG. 3 is a schematic plot view of spectral transmission of windows with and without high efficiency coatings.
Figure 4:
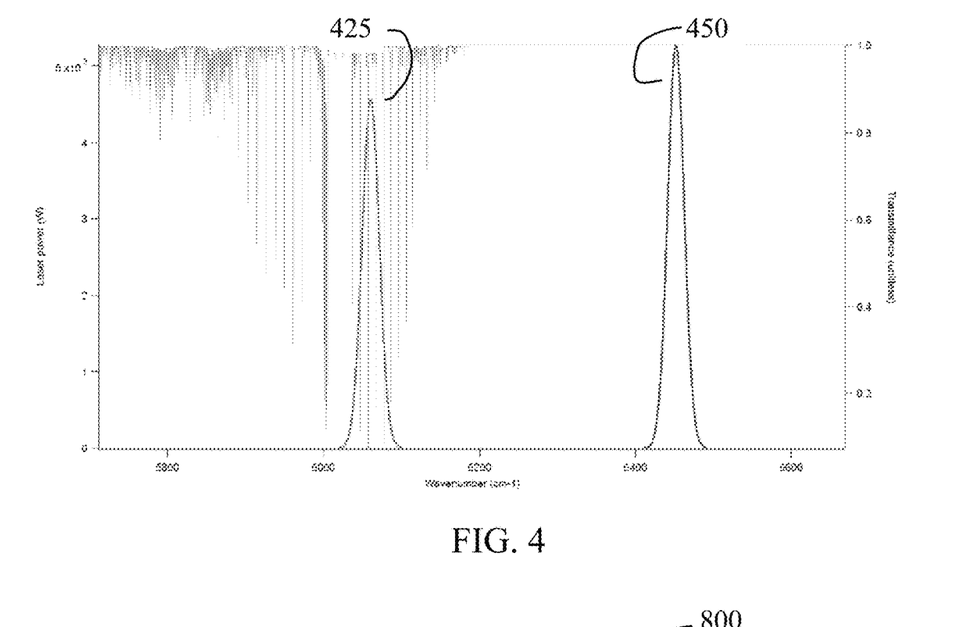
FIG. 4 is a schematic plot view showing selection of on-resistance and off-resistance wavelengths to enable accurate methane detection as described herein.
Figure 10A:
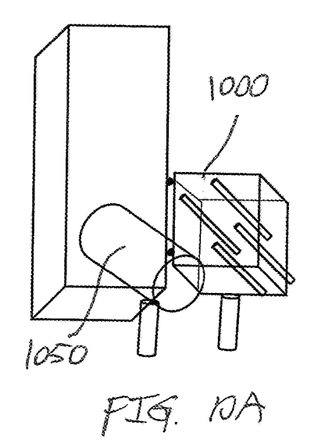
FIG. 10A is an example 887 nanometer imaging system according to one example embodiment described herein.
Figure 10B:
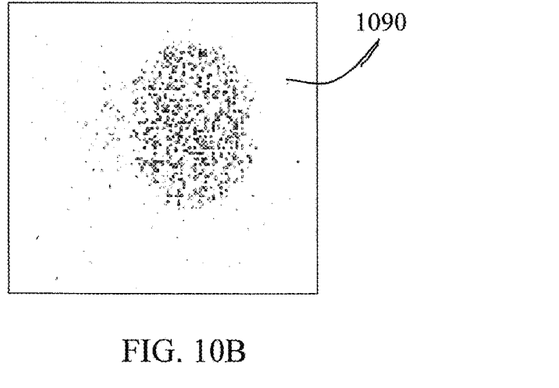
FIG. 10B is a schematic plot of detection of 2% methane plume collected with the system of FIG. 10A according to one example embodiment described herein.
Figure 11A:
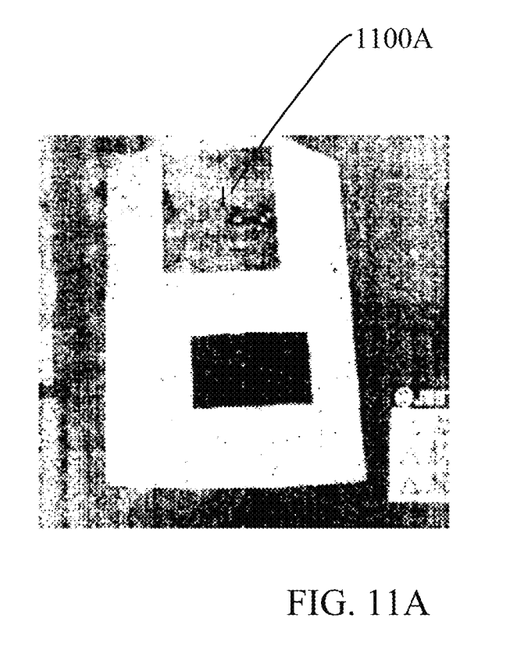
FIG. 11A is an 887 nanometer image of a test fixture utilized according to one example embodiment in which light penetrates a coated window as described herein.
Figure 11B:
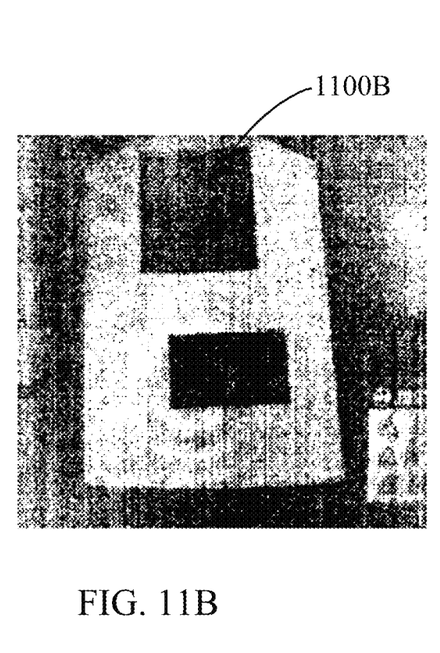
FIG. 11B is an 887 nanometer image of a test fixture utilized according to one example embodiment in which light penetrates through a different energy efficient coated window according to one example of a window.

A second system, shown by example in FIGS. 10A and 10B, has been developed to address the challenge of detecting methane through high efficiency coated windows. The methane band at 887 nm is detectable through most coated windows, however it is two orders of magnitude weaker than the 1650 nm band. To compensate for this signal loss, two significant changes were made from the original breadboard system:

1. A single, narrowband laser was selected to probe a specific rotational-vibrational transition, enhancing sensitivity over and above the broadband laser approach at 1650 nm. The center wavelength was then modulated on and off resonance, rather than using two independent lasers. The center wavelength could be chosen according to physical properties of a window between the light source (500) and a gas (570) under analysis. One of these properties may be the transmittance of a window and its coatings as shown in FIG. 3 for wavelengths of interest. The plots of FIG. 3 are labeled to show the transmission spectrum of windows having certain physical construction parameters. These values can be used in determining the wavelengths of light waves incident on the windows (535) in the systems described herein. The plots of FIG. 4 illustrate one example of selected on resonance (450) and off resonance (425) power levels for light sources (e.g., laser(s)) directing light waves to an area. These values can be selected in accordance with transmittance values (600) shown in FIG. 6. FIG. 11 illustrates that images according to this disclosure can be sufficiently clear to identify a location and concentration of gases through a window (see images 1100A, 1100B).
2. A lock-in imaging technology was used to compensate for the signal loss of the 887 nm band. Preliminary results show detection of methane behind coated windows. While these results are encouraging, this method required laser power levels that were not eye safe in order to achieve sufficient signal-to-noise ratios. Lock-in technology includes imaging devices in which pixels of the imaging equipment are capable of demodulating an optical wave impinging on the sensor at multiple wavelengths using the phase delay of the reflected light. This technology enables for information to be extracted from the image, such as time and distance information at each pixel.

Figure 1:
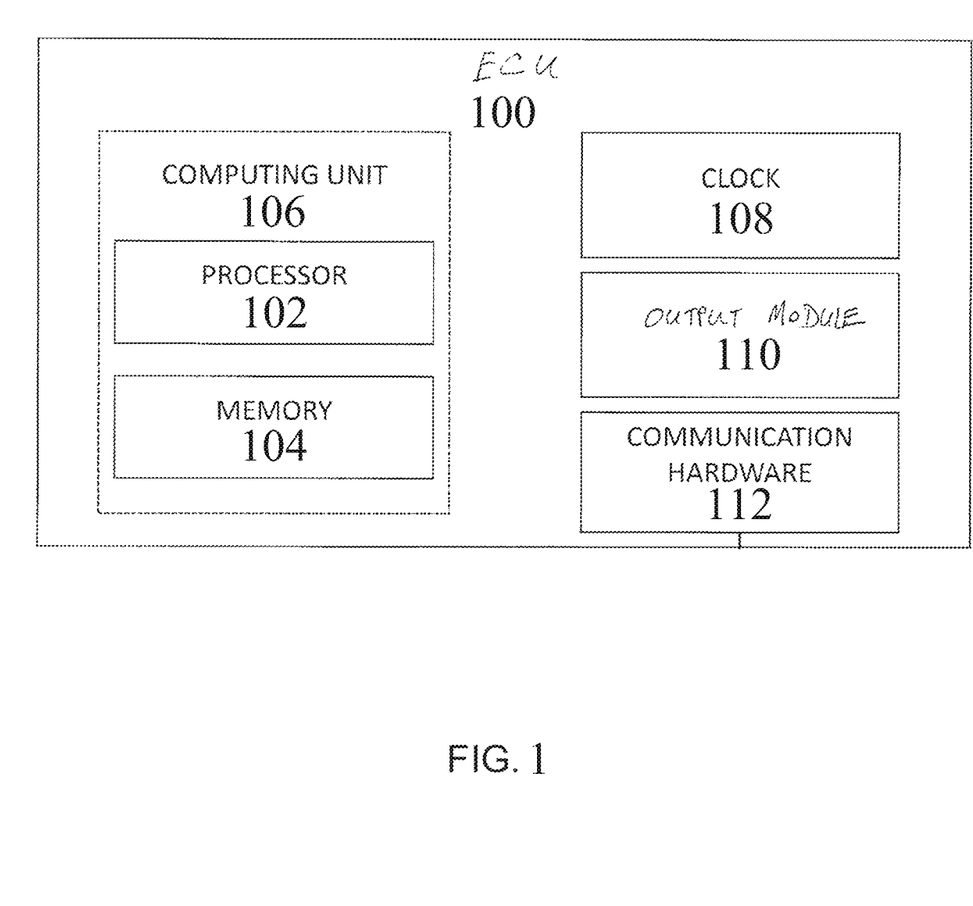
FIG. 1 is schematic outline of a computer control system that may be utilized with equipment described herein along with associated computerized software specific to the piece of equipment at hand.

Implementations described above and in relation to FIGS. 1 through 11 may be used with equipment that implements computerized methods that are activated with an electronic control unit ("ECU") 100 in a computer. In particular, the described equipment, including imaging apparatuses and spectrometers, communicate with a computer processor configured to process one or more characteristics and/or profiles of the electrical signals received. By way of example and without limiting this disclosure to any particular hardware or software, FIG. 1 illustrates a block diagram of a system herein according to one implementation.

The sensor system 100 may include a computing unit 106, a system clock 108, an output module 110 and communication hardware 112. In its most basic form, the computing unit 106 may include a processor 102 and a system memory 104. The processor 102 may be a standard programmable processor that performs arithmetic and logic operations necessary for operation of the sensor system 100. The processor 102 may be configured to execute program code encoded in tangible, computer-readable media. For example, the processor 102 may execute program code stored in the system memory 104, which may be volatile or non-volatile memory. The system memory 104 is only one example of tangible, computer-readable media. In one aspect, the computing unit 106 can be considered an integrated device such as firmware. Other examples of tangible, computer-readable media include floppy disks, CD-ROMs, DVDs, hard drives, flash memory, or any other machine-readable storage media, wherein when the program code is loaded into and executed by a machine, such as the processor 102, the machine becomes an apparatus for practicing the disclosed subject matter.

Additionally, the processor 102 may be configured to associate the sensed changes in the at least one electrical property of signals received from a horn grounding circuit with a time from the system clock 108 and store the sensed changes and corresponding time to the system memory 104. Optionally, the processor 102 may be configured to analyze the stored data and associate measured changes to calculate a control message distributed by an output module 110 with various control messages for controlling horn functions. The communication hardware 112 may further be configured for communicating the selected control message(s) to the horn system 120. The processor 102, which is in communication with memory 104, executes computer-readable instructions stored on the memory 104.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular implementations only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The implementation was chosen and described in order to best explain the principles of the invention and the practical application, and to enable others of ordinary skill in the art to understand the invention for various implementations with various modifications as are suited to the particular use contemplated.

Figure 5:
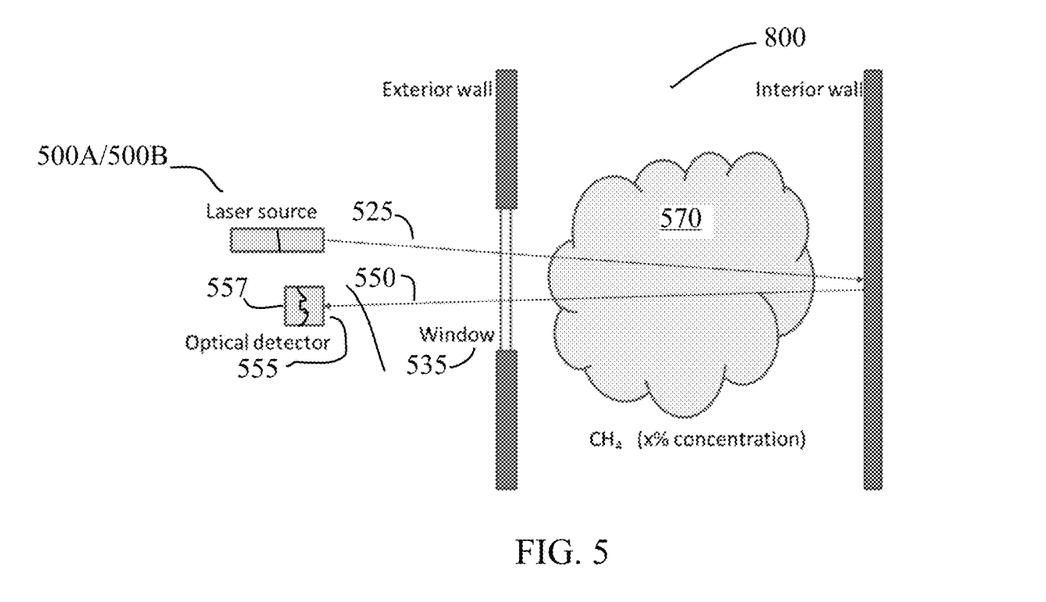
FIG. 5 is a schematic view of laser imaging for methane detection according to one implementation of this disclosure.

Numerous embodiments of this disclosure may be implemented according to the following steps. In one embodiment, a laser imaging system operates according to combinations of the following concepts illustrated in part by FIG. 5.

Figure 6:
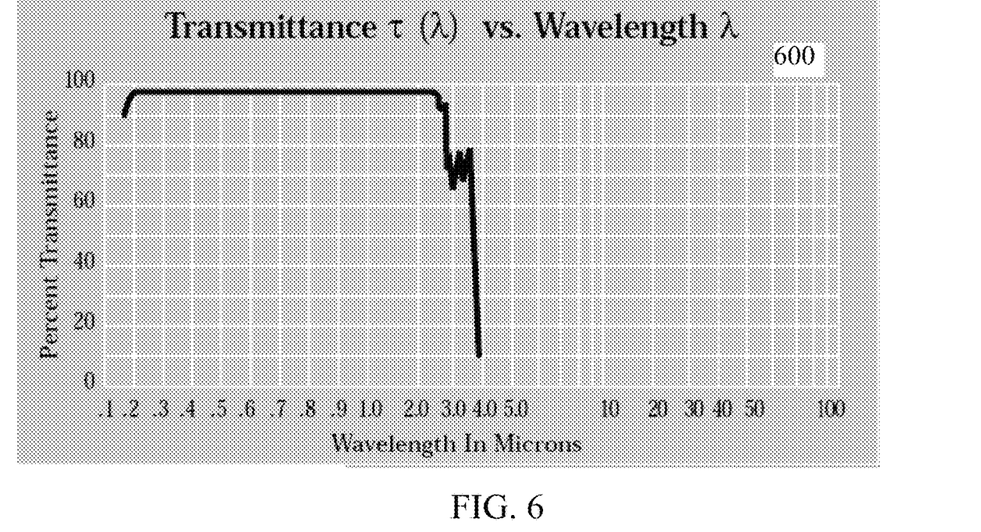
FIG. 6 is a schematic plot view of a typical glass window transmission spectrum as disclosed herein.
Figure 9:
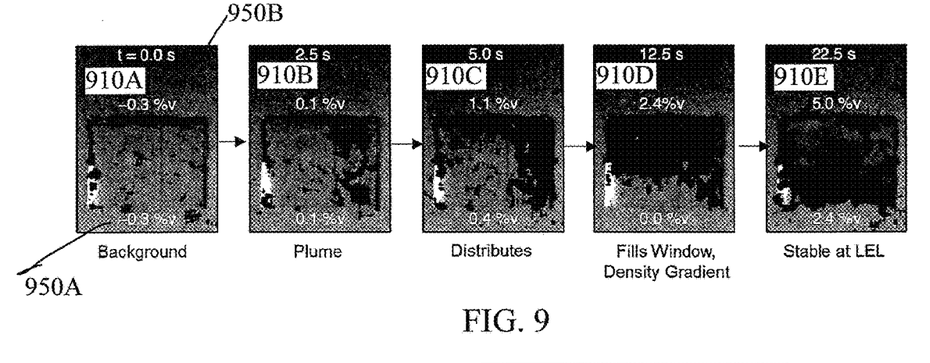
FIG. 9 is a time sequence of methane quantification during flow into the test chamber of FIG. 8.

1) One or more lasers (500A, 500B) illuminates a scene. At least one of these lasers emits a wavelength of light corresponding to a spectral absorption feature of a target gas (570).
2) An imager (555) records the reflected laser(s) radiation (550) using appropriate optics to image the scene onto a detector array (557) having a plurality of pixels. If multiple lasers or laser wavelengths are used, multiple images may be recorded.
3) FIG. 8A shows a set up by which the reflection data received at the imaging array are collected and analyzed to quantify the laser light absorbed by the target gas at each pixel in the imaged scene. FIG. 6 illustrates such absorption at numerous wavelengths.
4) The absorption results, image data, and other sensor data are further analyzed to determine the concentration of the target gas for each pixel within the imaged scene. FIG. 9 illustrates displaying these concentrations (950A, 950B) at frames shown at five different points in time.
5) The concentration data are displayed to the system operator as a 'map' of the gas concentration within the imaged scene as shown in FIG. 8B (800).
6) Steps 1-5 are repeated at a fast-enough rate for the concentration map to update in real-time.

Among the innovations that enable the system to achieve these results are:

A. Combination of geometric data regarding the light source position relative to a target enclosure, the imaging array position relative to the light source position and the target enclosure, and the resulting image with absorption data to quantify the concentration in Step 4 above. The absorption data alone cannot determine the gas concentration, only the product of concentration and optical path length. Geometric information in the image can determine the size of gas plumes, providing an estimate of the optical path length through the plume. From this estimated path length, the gas concentration is calculated. This is different from current practice where the concentration length product is quoted typically in parts per million-meter.

B. Use of imager geometry information, stereoscopic imaging, and range information to estimate the size of objects in the image, including the gas plume in Step 4. An imager collects a 2-dimensional projection of the 3-dimensional scene. To determine the size of an object/plume in the scene, it is necessary to combine this 2-dimensional data with other information. The current disclosure uses information on the imager geometry to estimate sizes. The current invention uses stereoscopic imaging—images collected from two or more distinct imager positions—to calculate the 3-dimensional positions and sizes of objects.

The stereoscopic imaging could also be achieved by using a single imager in multiple viewing positions by the operator. The current invention uses range-finding data, across the entire scene, to determine the distance to reflective objects. This distance information can be combined with imager geometry information to determine the size of other objects (e.g., gas plumes) at that same distance.

C. Use of models for gas dispersion to estimate the 3-dimensional size and shape of gas plumes from their 2-dimensional image in Step 4. For the determination of concentration, the most important dimension of the plume is the dimension along the path of the laser light. However, the information data points gathered by the imager are perpendicular to this dimension. A gas plume that is freely dispersing, without wind or an interfering object altering its shape, rises or falls relative to the gravitational direction (due to buoyancy) and diffuses out in the two perpendicular directions. The 2-dimensional image captures data on dispersion in at least two of these directions, and knowledge of the target gas and gravitational direction will then allow the plume shape to be estimated in all three dimensions. Interfering objects can be accounted for since their presence and shape are also captured in the image. Wind impact can be measured and accounted for with the technology described herein.

D. Use of two laser wavelengths in Steps 1 and 2, one wavelength corresponding to a "strong" spectral absorption of the gas and a second wavelength corresponding to a "weak" spectral absorption of the gas. Strong and weak are only relative to one another. The power of the laser light reflected to the imager is impacted by the laser power output, the geometry of objects in the scene, the reflectance of objects in the scene, and the distance of objects in the scene. If the target gas is present, then it can also alter the power. However, the laser wavelength range that is altered by the gas is narrow and specific. The inclusion of an additional laser illuminator, at a wavelength not affected by the gas, provides a source of information about the other factors affecting the reflected power.

1. Use of two lasers in Steps 1 and 2 to achieve this wavelength pairing. In Step 3, the data collected at these two wavelengths can be combined to separate the systematic effects from the effect of the gas on the reflected light that forms the image on the array.
2. Use of one laser in Steps 1 and 2 that is capable of emitting at this pair of wavelengths. During Step 2, data can be recorded at one wavelength and then the other. These distinct images are analyzed in Step 3 to determine the effect of the gas alone.
3. Use of one laser in Steps 1 and 2 that is capable of emitting at this pair of wavelengths. During Step 2, the laser is modulated between these two wavelengths and the imager is synchronized with this modulation frequency in order to detect the reflectivity difference.

E. Combination of a modulated laser and a lock-in imager in Steps 1 and 2 to directly measure the difference in reflection between a wavelength absorbed by the gas and not absorbed by the gas. The lock in imager and laser use the same modulation reference signal to know which wavelength is present at each monitored point of time. The lock-in imager is sensitive only to the modulated information, determining the reflectivity difference value directly, and filtering out other sources of imager noise.

1. Use of the lock-in imager to also measure "time of flight" distance to reflectors in the scene. These distance data will be used in Step 4.
2. Use of the lock-in imager to also measure the absolute magnitude of power reflected at a reference wavelength. This power data will be used in Step 3.

In one example, this disclosure was implanted in a hand-held, portable methane imager. For example, and without limiting this disclosure, major system components may include a 1550 nm laser, a 1650 nm Laser, an infrared ("IR") imager, and customized image processing software (i.e., software created in MATLAB. The testing was moved to gas testing in a vented hood. The chamber was flooded with methane while actively sensing the enclosure. Transmission through various window types (double paned, coated) was tested. The results were tabulated partially in Table 1.

TABLE 1

| Requirement | Methane Imager Lab Demonstration | Single Point Laser Detectors | SENSEIT Gold FID |
|---|---|---|---|
| Image through uncoated window | Accurate with uncoated window at angle | Accurate with uncoated window at angle | N/A |
| Image through coated window | Inaccurate with coated window due to high surface reflections | Inaccurate with coated window due to high surface reflections | N/A |
| Limit of detection 0.02% v | 0.45% volume (9% LEL-lower explosive limit ) | 0.01% | 0.1% |
| Accuracy, +/−10% | +/−5% | Do not provide concentration (% LEL-lower explosive limit) | +/−5% |

Example embodiments of this disclosure include a system for evaluating a target gas (570) within an area of space (800). The system includes at least one light source (500A, 500B) directing a light wave (525) toward an area of space (800) to be analyzed in regard to a target gas (570). At least one processor in at least one computer modulates the light source between an on-resonance state (250), relative to the absorption spectrum of the target gas, and an off-resonance state (255), relative to the absorption spectrum of the target gas. An imaging device (555) is positioned relative to the area of space such that the imaging device receives reflected light from the area of space, and the imaging device is configured to form an image (900A-900E) from the reflected light showing the presence or absence of the target gas within the area of space. The at least one light source may include a first light source (500A) and a second light source (500B). As discussed above and without limiting the disclosure, the first and second light sources may be utilized in the above described 1650 nm wavelength system. The first light source may include a first laser emitting light at a first wavelength and the second light source may include a second laser emitting light at a second wavelength. Both of the light sources are aimed to direct a sequence of light waves at the target area. The reflected light (550) comprises at least a first wavelength reflection and a second wavelength reflection directed back to the imaging device (555). In the embodiments utilizing at least two lasers, the on resonance state of the first laser operates at the first wavelength of light set to correspond to a selected resonance frequency of the absorption spectrum of the target gas. The off resonance state of the second laser is set to operate at the second wavelength of light corresponding to a frequency other than a resonance frequency of the absorption spectrum of the target gas.

In other embodiments, such as the 887 nm system described above and shown by example in FIG. 10A, the light source may be a single light source (1000) that modulates a single laser between the on resonance state and the off resonance state. In this embodiment, the imaging device (1050) is a locked in imager, and the imaging device is configured to produce an image (1090) shown in FIG. 10B of the area comprising a location of a gas plume of the target gas.

The imaging device may be any one of a number of devices utilizing an array of pixels that are activated in accordance with different wavelengths of light incident thereon. The image of the area comprises pixels having intensity values that correspond to a concentration of the target gas at a point in the image that corresponds to a location within the area. As noted above, the 887 nm system is particularly useful when there is a window between the light source and the target gas, and the reflected light travels through the window back to the imaging device. In this scenario, the on resonance state of the light source and the off resonance state of the light source are selected to match the transmittance of light through the window. The construction of the window, including coatings and energy efficiencies in its materials, can be utilized to determine the on resonance and the off resonance states for the light source.

In a method embodiment, a method of evaluating a target gas within an area of space includes the steps of directing at least one light wave from at least one light source toward an area of space to be analyzed in regard to a target gas. Modulating the light source between an on-resonance state, relative to the absorption spectrum of the target gas, and an off-resonance state, relative to the absorption spectrum of the target gas, allows for a resulting image to incorporate the target gas images more predominantly than any other structures in the light path. The method continues by receiving, at an imaging device, reflected light wherein the reflected light includes a first wavelength reflection corresponding to the on-resonance state and a second wavelength reflection corresponding to the off resonance state of the light source. The imaging device is configured for forming an image of the target gas in the area with the reflected light. This method is characterized, in part and without limiting the disclosure, by positioning the light source and the imaging device remotely from the area of space being imaged such that the imaging device receives the reflected light from the area of space at a distance. As noted above, the distance would be calculated as a safest distance possible and in one example the method is performed using hand-held equipment at a distance of 30 feet or more. This distance may be computed in conjunction with the concentration value at a lower explosive limit (LEL) for the target gas.

In accordance with the equipment described above, the method embodiment may include steps of modulating the light source with a first laser set to the on resonance state and a second laser set to the off resonance state. Modulating the light source may utilize a single laser configured to emit a first wavelength corresponding to the on resonance state of the system and a second wavelength corresponding to the off resonance state.

This disclosure includes all features and embodiments of the claims that follow.

The invention claimed is:

1. A system for evaluating methane concentration within an area of space, the system comprising:
 at least one light source directing a light wave toward a windowpane comprising coatings on the windowpane, wherein the windowpane with the coatings is positioned between the at least one light source and an area of space to be analyzed in regard to methane, wherein the light wave comprises a center wavelength corresponding to the transmittance of light through the windowpane and the coatings;
 at least one processor in at least one computer modulating the light source between an on-resonance state, relative to the absorption spectrum of the methane and an off-resonance state, relative to the absorption spectrum of the methane;
 an imaging device positioned relative to the area of space such that the imaging device receives reflected light from the area of space, the imaging device configured to form an image from the reflected light showing the presence or absence of the methane within the area of space.

2. The system of claim 1 wherein the at least one light source comprises a first light source and a second light source.

3. The system of claim 2, wherein the first light source comprises a first laser emitting light at a first wavelength and the second light source comprises a second laser emitting light at a second wavelength, and wherein the reflected light comprises at least a first wavelength reflection and a second wavelength reflection.

4. The system of claim 3, wherein the on-resonance state of the first laser comprises the first wavelength of light set to correspond to a selected resonance frequency of the absorption spectrum of the methane.

5. The system of claim 3, wherein the off-resonance state of the second laser comprises the second wavelength of light set to correspond to a frequency other than a resonance frequency of the absorption spectrum of the methane.

6. The system of claim 1, wherein the imaging device is a locked-in imager.

7. The system of claim 6, wherein the light source is a single light source that modulates between the on-resonance state and the off-resonance state.

8. The system of claim 1, wherein the imaging device is configured to produce an image of the area comprising a location of a gas plume of the methane.

9. The system of claim 1, wherein the image of the area comprises pixels having intensity values that correspond to a concentration of the methane at a point in the image that corresponds to a location within the area.

10. The system of claim 1, wherein the windowpane with the coatings is between the light source and the methane, and wherein the reflected light travels through the windowpane and the coatings back to the imaging device.

11. The system of claim 10, wherein the on-resonance state of the light source and the off-resonance state of the light source are selected to match the transmittance of light through the windowpane and the coatings.

12. A method of evaluating methane concentration within an area of space, the method comprising:
 directing at least one light wave from at least one light source toward an area of space to be analyzed in regard to methane concentration and through a windowpane comprising coatings on the windowpane, wherein the windowpane and the coatings together having a transmittance for light wavelengths that is different from a respective transmittance of an uncoated windowpane;
 modulating the light source between an on-resonance state, relative to the absorption spectrum of the methane, and an off-resonance state, relative to the absorption spectrum of the methane,
 receiving, at an imaging device, reflected light wherein the reflected light includes a first wavelength reflection corresponding to the on-resonance state and a second wavelength reflection corresponding to the off-resonance state of the light source; and
 calculating a ratio of reflected light signals at the first wavelength reflection and the second wavelength reflection to evaluate the methane concentration.

13. The method of claim 12, further comprising positioning the light source and the imaging device remotely from the area of space such that the imaging device receives the reflected light from the area of space at a distance.

14. The method of claim 12, further comprising modulating the light source with a first laser set to the on-resonance state and a second laser set to the off-resonance state.

15. The method of claim 12, comprising modulating the light source with a single laser configured to emit a first wavelength corresponding to the on-resonance state and a second wavelength corresponding to the off-resonance state.

16. The method of claim 12, wherein the windowpane comprises a double pane.

17. The method of claim 12, wherein the on-resonance wavelength for the methane is at 887 nanometers.

18. The method of claim 12, further comprising forming a map of methane concentrations within area of space.

19. The method of claim 12, further comprising determining a size of methane plumes in the area of space with geometric data regarding light source position, imaging device position, and position of the area of space.

20. The method of claim 19, further comprising estimating an optical path length through the methane to calculate the methane concentration.

* * * * *